(12) United States Patent  (10) Patent No.: US 7,539,079 B2
Hoogeveen et al.  (45) Date of Patent: May 26, 2009

(54) SYSTEM AND METHOD FOR DETERMINING POSITIONS OF TOWED MARINE SOURCE-ARRAY ELEMENTS

(75) Inventors: Jeroen Hoogeveen, Bekkestua (NO); Stian Hegna, Hovik (NO)

(73) Assignee: PGS Geophysical AS, Lysaker (NO)

( * ) Notice: Subject to any disclaimer, the term of this patent is extended or adjusted under 35 U.S.C. 154(b) by 72 days.

(21) Appl. No.: 11/392,420

(22) Filed: Mar. 29, 2006

(65) Prior Publication Data

US 2007/0230268 A1 Oct. 4, 2007

(51) Int. Cl.
*G01V 1/38* (2006.01)
(52) U.S. Cl. .......................................... 367/19; 367/127
(58) Field of Classification Search ................... 367/19, 367/127, 130
See application file for complete search history.

(56) References Cited

U.S. PATENT DOCUMENTS

| 4,187,492 | A | * | 2/1980 | Delignieres | 367/19 |
|---|---|---|---|---|---|
| 4,476,553 | A | | 10/1984 | Ziolkowski et al. | |
| 4,660,185 | A | | 4/1987 | French | |
| 4,862,422 | A | * | 8/1989 | Brac | 367/19 |
| 4,868,794 | A | | 9/1989 | Ziolkowski et al. | |
| 4,970,698 | A | | 11/1990 | Dumestre, III | |
| 5,668,775 | A | * | 9/1997 | Hatteland | 367/19 |
| 5,790,472 | A | * | 8/1998 | Workman et al. | 367/19 |
| 2005/0180263 | A1 | | 8/2005 | Lambert et al. | |
| 2005/0259513 | A1 | | 11/2005 | Parkes | |

FOREIGN PATENT DOCUMENTS

GB 1 571 138 7/1980

* cited by examiner

*Primary Examiner*—Ian J Lobo
(74) *Attorney, Agent, or Firm*—E. Eugene Thigpen; Charles R. Schweppe

(57) ABSTRACT

A system comprises a plurality of seismic transmitters, at least one seismic source array, and a processor. Each seismic source array comprises a plurality of seismic source-array elements, mounted within the seismic source array; and a plurality of near-field sensors, wherein each near-field sensor is mounted within the seismic source array in the vicinity of one of the seismic source-array elements. The processor is adapted to determine relative positions of the seismic source-array elements on the seismic source array from the seismic signals transmitted by the seismic transmitters and received at the near-field sensors on the seismic source array.

22 Claims, 6 Drawing Sheets

SYSTEM AND METHOD FOR DETERMINING POSITIONS OF TOWED MARINE SOURCE-ARRAY ELEMENTS

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of marine seismic data acquisition.

2. Description of the Related Art

In the field of geophysical prospecting, knowledge of the subsurface structure of the earth is useful for finding and extracting valuable mineral resources, such as oil and natural gas. A well-known tool in geophysical prospecting for seismic data acquisition is a seismic survey. In a seismic survey, seismic waves are generated by appropriate seismic sources and transmitted into the earth. In a land-based seismic survey, the seismic signal is generated by injecting a seismic signal from on or near the earth's surface, which then travels downwardly into the subterranean formations located in the subsurface of the earth. In a marine seismic survey, the seismic signal also travels through a body of water before reaching the subsurface of the earth.

When the seismic signal encounters a seismic reflector, such as an interface between two different rock formations having different acoustic impedances, a portion of the seismic signal is reflected back toward the surface. The seismic signals reflected from the subterranean formations are then detected by appropriate seismic sensors. The sensors measure amplitudes of physical aspects of the passing seismic signals, convert the measurements to electrical signals, and transmit those signals to an appropriate location for storage and processing. Seismic data processing techniques are applied to the collected seismic data to estimate the structure and possible hydrocarbon content of a portion of the earth's subterranean formations.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly know in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays along a seismic cable.

In a marine seismic survey, the seismic sensors are deployed in several conventional arrangements, including within ocean bottom cables laid on the water bottom, within vertical cables suspended in the water or in boreholes, or within substantially horizontal submerged cables (commonly called seismic streamers). The seismic streamers are typically towed through the water by ship, but alternatively may be maintained at a substantially stationary position, floating at a selected depth in the water.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an airgun. Typically, a marine seismic source consists not of a single source element, but of a spatially-distributed array of source elements. This arrangement is particularly true for airguns, currently the most common form of marine seismic source. Further, two or more source arrays are typically deployed in a marine seismic survey, to permit alternating activation of the source arrays.

Seismic sources and source arrays will be discussed in the context of arrays of airguns, since airguns are the most commonly-employed type of seismic source in the industry. A typical airgun contains a volume of air compressed to about 2000 psi (pounds per square inch) or more. Upon activation, commonly referred to as a "shot", the airgun abruptly releases its compressed air to create an air bubble, leading to an expanding sound wave in the water. The resulting wave front constitutes the seismic signal that is reflected at the interfaces of subterranean earth formations and detected by the seismic sensors, as discussed above.

Although modern seismic sources such as airguns produce stable, repeatable wavefields in a laboratory situation, the wavefields produced by seismic source arrays deployed under natural conditions at sea are not so consistent. In a marine environment, the wavefields of seismic source arrays vary from shot to shot because the physical factors that determine the seismic source wavefields vary. If these seismic source variations could be monitored accurately, the seismic source variation data could be used to significantly enhance the quality of the resultant seismic data. Correcting for seismic source variations may be particularly important in situations requiring four-dimensional or time lapse seismic data acquisition, such as for reservoir monitoring. In these situations, the desired signal may comprise very small differences between acquired seismic data sets and this small signal may be obscured by noise introduced by the seismic source variations. However, shot to shot variations in marine seismic sources are often not monitored, primarily because it is difficult to do.

In the case of airguns, seismic source variations are caused by variations in the physical factors related to the individual airguns, the arrangement of airguns in arrays, and the environment. These physical factors include, but are not limited to, airgun depths, airgun pressure, airgun drop-outs (misfires), airgun timing, water surface conditions (roughness) affecting the ghost surface reflections, water temperature, local sound velocity in the water, atmospheric pressure, and three-dimensional geometry of the airgun arrays and sub-arrays. Some of these physical factors are measured during each shot. Other factors change more slowly and are thus measured less often.

The three-dimensional geometry factor includes the relative positions of all the elements of the airgun array. Since the airgun array may also comprise sub-arrays of airguns, the geometry includes the relative positions of airguns within sub-arrays as well as the relative positions of sub-arrays within the entire array. The array geometry determines how the individual air bubbles created by the airguns interact with each other. These bubble interactions have a significant effect on the generation of the source wavefield for the entire source array. Thus, variations in the three-dimensional geometry of the airgun arrays and sub-arrays have a significant effect on the variations in the seismic signals generated by the airgun arrays. If the airgun array is not rigid, then airgun geometry is typically measured for each shot. Relative positioning of the airguns sub-arrays is typically measured by GPS (Global Positioning System) receiver units mounted on the seismic source sub-arrays. Occasionally, however, the GPS receiver units fail. These failures lead to expensive downtime during the seismic surveys while the GPS units are repaired or replaced.

Thus, a need exists for a system for more accurate determination of the positions of source-array elements in a towed marine source array. This position-determination system could then provide an alternative or backup system for conventional means, such as GPS receiver units. Preferably, this position-determination system would also employ equipment already being used in current marine seismic surveys.

BRIEF SUMMARY OF THE INVENTION

The invention is, in one embodiment, a system for determining positions of towed marine seismic source-array elements. The system comprises a plurality of seismic transmitters, at least one seismic source array, and a processor. Each seismic source array comprises a plurality of seismic source-array elements, mounted within the seismic source array, and a plurality of near-field sensors. Each near-field sensor is mounted within the seismic source array in the vicinity of one of the seismic source-array elements. The processor is adapted to determine relative positions of the seismic source-array elements on the seismic source array from the seismic signals transmitted by the seismic transmitters and received at the near-field sensors on the seismic source array.

The invention is, in another embodiment, a method for determining positions of towed marine seismic source-array elements. A plurality of seismic transmitters are towed. Additionally, a plurality of seismic source arrays are towed, with each seismic source array comprising a plurality of seismic source-array elements mounted within the seismic source array and a plurality of near-field sensors. Each near-field sensor is mounted within the seismic source array in the vicinity of one of the seismic source-array elements. Seismic signals are transmitted from the seismic transmitters. The transmitted seismic signals are received at near-field sensors on the seismic source array. Relative positions of the seismic source-array elements on the seismic source array are determined from the received seismic signals.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a system and a method for determining positions of towed marine seismic source-array elements. In one embodiment, seismic signals are transmitted from source-array elements located within a first (active) seismic source array and are detected by near-field sensors positioned near the source-array elements located within a second (passive) seismic source array. In another embodiment, conventional or purpose-built seismic transmitters are deployed to replace or supplement the transmission of seismic signals from the seismic-array elements.

The seismic signals detected by the near-field sensors located on the passive seismic source array are processed to yield the travel times between pairs of source-array elements located on the active seismic source array or other transmitters located in the seismic data acquisition tow system and near-field sensors located on the passive seismic source array. The travel distances between these pairs of source-array elements or seismic transmitters and near-field sensors is then determined, preferably utilizing the local sound velocity in water.

These travel distances can then be used, in turn, to calculate the relative positions of the source-array elements and near-field sensors in the seismic source arrays. This calculation can be accomplished by solving a trilateration network representation comprising the calculated travel distances and also using any other available information concerning the geometry of the seismic source arrays. Then the relative positions of the source-array elements located on the passive source array can be determined from knowledge of the proximity of the source-array elements to the near-field sensors located on the passive source array.

Figure 1:
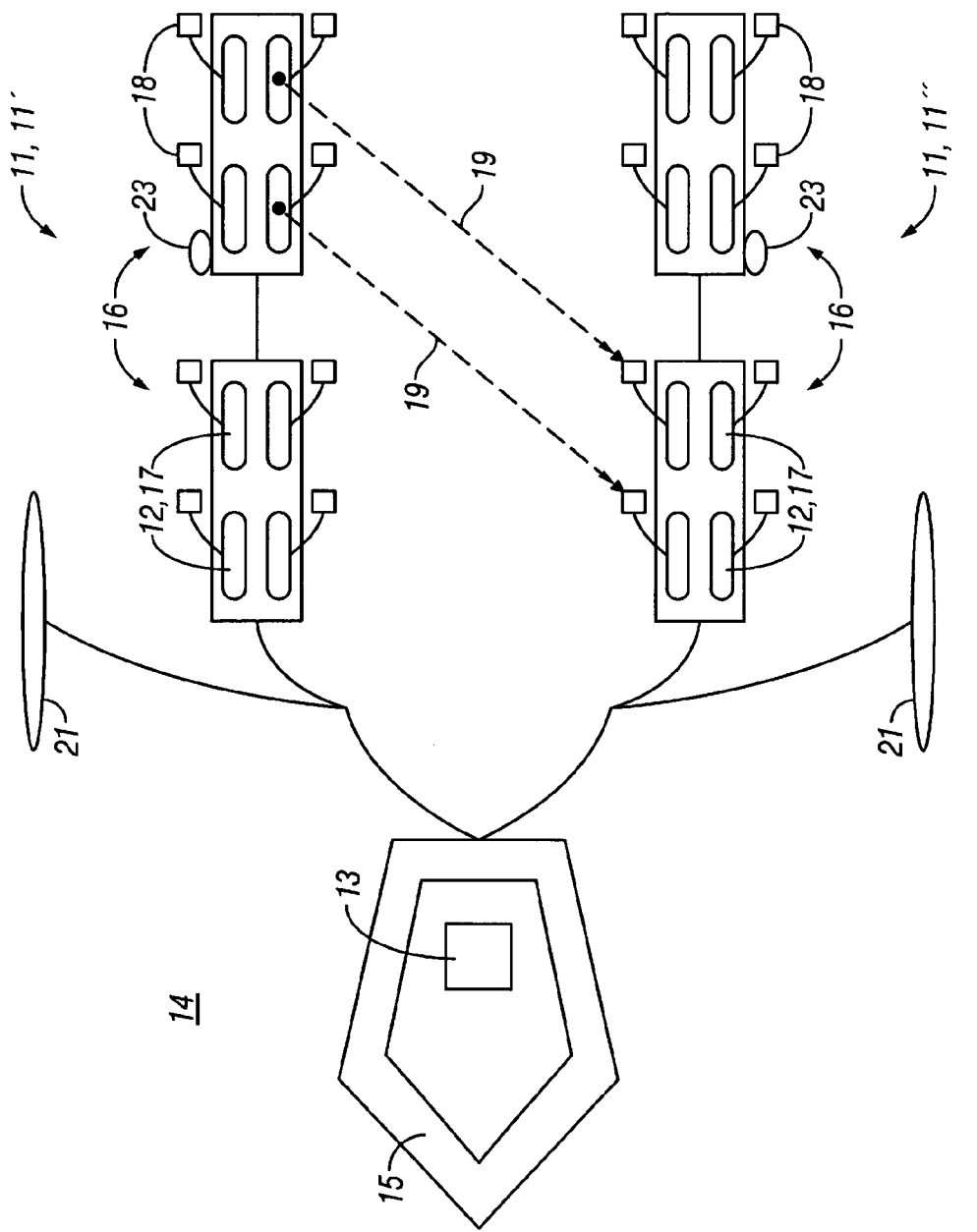
FIG. 1 is a plan schematic view of an embodiment of the system of the invention for determining positions of seismic source-array elements in a towed marine source array, utilizing the seismic source-array elements as the seismic transmitters.
Figure 2:
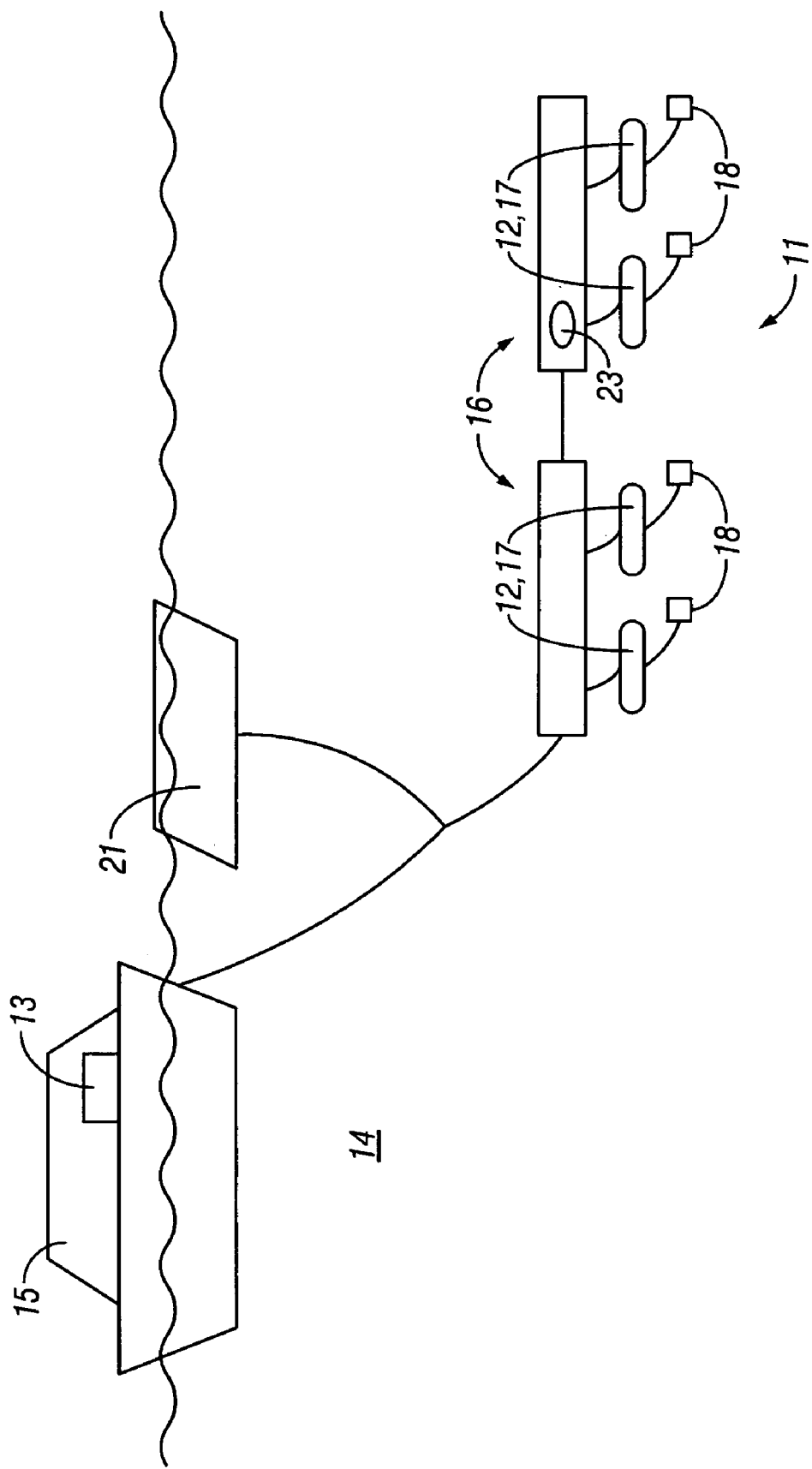
FIG. 2 is a side schematic view of an embodiment of the system of the invention for determining positions of seismic source-array elements in a towed marine source array, utilizing the seismic source-array elements as the seismic transmitters.

FIGS. 1 and 2 are schematic views (not to scale) of an embodiment of the system of the invention for determining positions of seismic source-array elements in a towed marine source array. In this embodiment, seismic source-array elements are utilized as the seismic transmitters. FIG. 1 is a plan or top view, while FIG. 2 is the corresponding side view of the system.

The system of the invention primarily comprises at least one seismic source array 11, at least one seismic transmitter 12, and at least one processor 13. The seismic source arrays 11 and the seismic transmitters 12 are typically towed through a body of water 14 by one or more seismic survey vessels 15, as will be discussed in detail below. The processors 13 are usually located on one of the seismic survey vessels 15. The accompanying seismic sensors utilized in conventional marine seismic data acquisition are not shown in FIG. 1, merely for illustrative simplicity. The seismic sensors may be deployed in any combination of arrays, such as in ocean bottom cable, vertical cable, well bores, or marine seismic streamers. In particular, marine seismic streamers could be towed by the same seismic survey vessel 15 towing the seismic source arrays 11.

Each seismic source array 11 may (and typically does) comprise a plurality of seismic source sub-arrays 16, although this is not a requirement of the invention. In general, a seismic source array 11 comprises a plurality of seismic source-array elements 17, mounted within the seismic source array 11 or seismic source sub-arrays 16, and a plurality of near-field sensors 18, also mounted within the seismic source array 11 or seismic source sub-arrays 16. Further, each near-field sensor 18 is mounted in the vicinity of one of the seismic source-array elements 17. For simplicity, the seismic source-array elements 17 and the near-field sensors 18 will be described here as mounted within the seismic source arrays 11, with the understanding that mounting within seismic source sub-arrays 16 is included.

The seismic source-array elements 17 in the seismic source arrays 11 are adapted to transmit conventional seismic signals 19 (illustrated by a dashed arrow in FIG. 1). In the typical case, as discussed above, these seismic source-array elements 17 are airguns and the seismic source arrays 11 are airgun arrays, possibly further comprising airgun sub-arrays as seismic source sub-arrays 16. The near-field sensors 18 in the seismic source arrays 11 are adapted to receive the seismic signals 19 transmitted by the seismic source-array elements 17. In the typical case, these near-field sensors 18 are conventional water pressure sensors such as hydrophones (commonly referred to as "near-field phones"). Other appropriate types of near-field sensors 18 include, but are not limited to, particle velocity sensors, particle displacement sensors, particle acceleration sensors, or pressure gradient sensors.

One common embodiment of this arrangement of seismic source-array elements 17 and near-field sensors 18 is the notional source method, well-known in the art of marine seismic data acquisition, employed in seismic source signature monitoring for airgun arrays. The notional source method is discussed in U.S. Pat. Nos. 4,476,553 and 4,868,794, both to Antoni M. Ziolkowski et al., titled "Method of Determining the Signatures of Arrays of Marine Seismic Sources" and "Method of Accumulation data for Use in Determining the Signatures of Arrays of Marine Seismic Sources", respectively. In the notional source method, each of a plurality of seismic source elements 17, an airgun, has a near-field sensor 18, a hydrophone, mounted adjacently on the seismic source array 11, an airgun array, at a distance of approximately 1 meter. The near-field sensor 18 is positioned to detect the source signature of the adjacent seismic source element 17 for combination with the source signatures detected by all of the near-field sensors 18. Further processing leads to a calculated source signature that is representative of the far-field source signature for the entire seismic source array 11.

At least two source arrays 11 are typically towed in marine seismic data surveys, to permit alternating activation of the source arrays 11. Although more than two source arrays 11 may be towed, the invention will be illustrated by an embodiment with two source arrays 11, each with two seismic sub-arrays 16. Describing the invention in the embodiment with only two source arrays 11 is not intended as a limitation of the invention, but merely for purposes of illustrative clarity. The extension of the illustrated method to embodiments with more than two source arrays 11 is straight forward.

Figure 3:
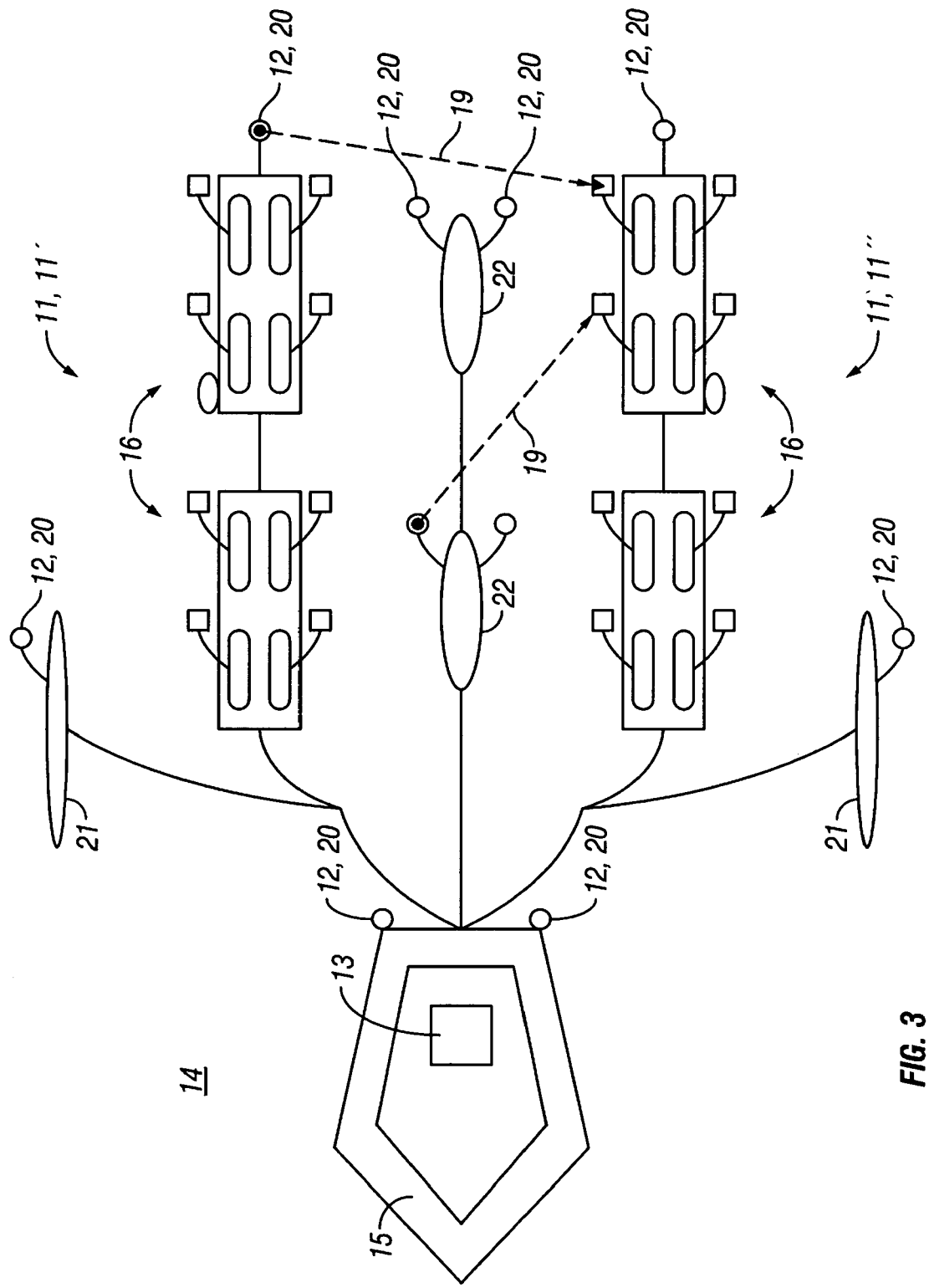
FIG. 3 is a plan schematic view of an embodiment of the system of the invention for determining positions of seismic source-array elements in a towed marine source array, utilizing purpose-built seismic transmitters as the seismic transmitters.
Figure 4:
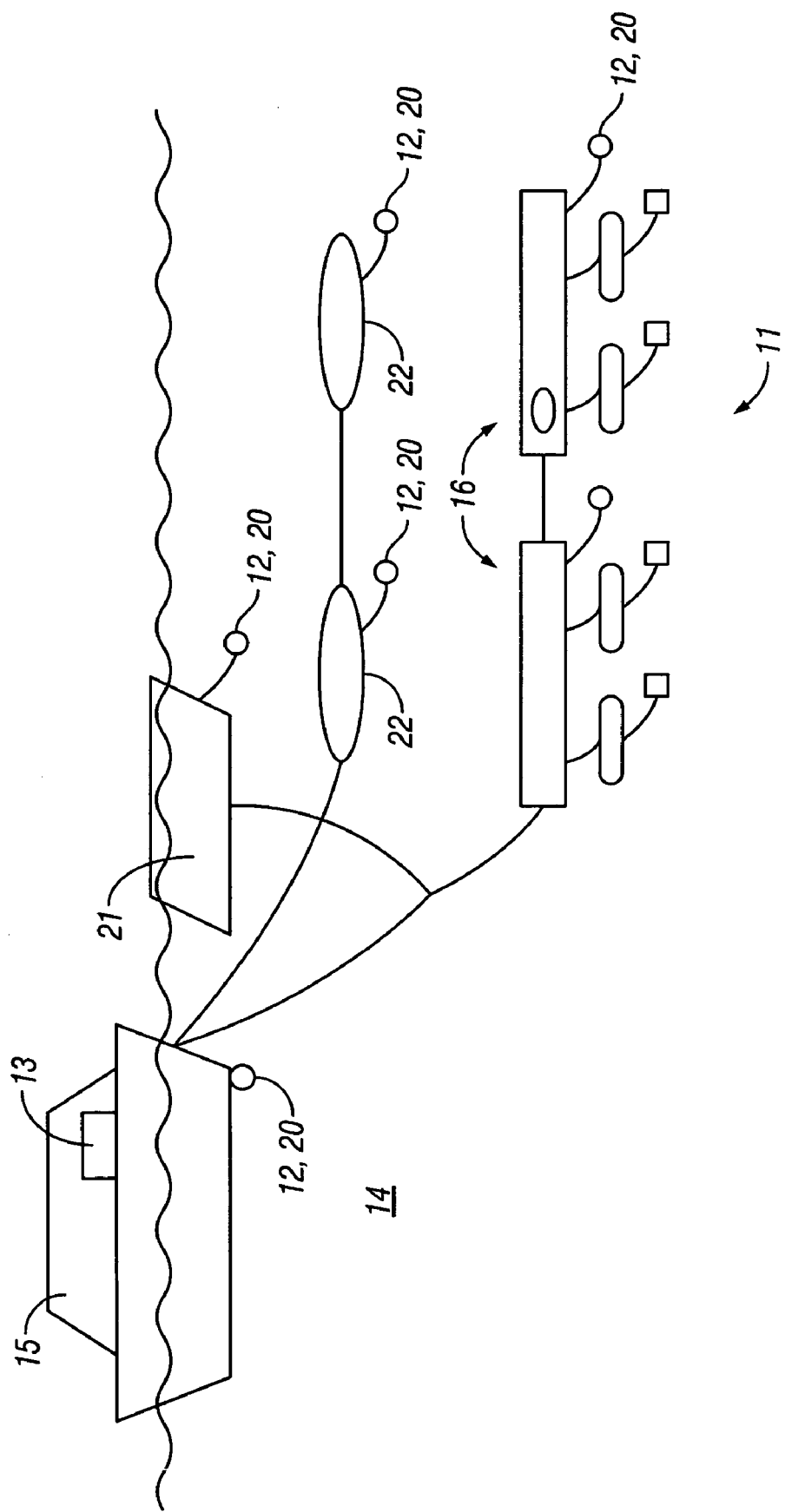
FIG. 4 is a side schematic view of an embodiment of the system of the invention for determining positions of seismic source-array elements in a towed marine source array, utilizing purpose-built seismic transmitters as the seismic transmitters.

The seismic transmitters 12 can be any type of transmitter known in the art of marine seismic data acquisition. In one embodiment, illustrated in FIGS. 1 and 2, the seismic transmitters 12 are the seismic source-array elements 17 located on the seismic source arrays 11. FIGS. 3 and 4 illustrate another embodiment. FIGS. 3 and 4 are schematic views (not to scale) of an embodiment of the system of the invention for determining positions of seismic source-array elements in a towed marine source array, in which alternative transmitters 20 are utilized as the seismic transmitters 12. FIG. 3 is a plan or top view, while FIG. 4 is the corresponding side view of the system.

The source-array elements 17 can be replaced or supplemented by alternative transmitters 20 of known position in the system of the invention. These alternative transmitters 20 can be conventional or purpose-built transmitters. In one embodiment employing conventional transmitters, these alternative transmitters 20 could be mounted on the hulls of seismic survey vessels 15. In one preferred embodiment, two alternative transmitters 20 are mounted on the hull of the seismic survey vessel 15 towing the seismic source arrays 11. These two alternative transmitters 20 are of the type known in the art as "pingers".

In other embodiments, purpose-built transmitters could be employed as the alternative transmitters 20 to emit a seismic signal 19 in a bandwidth that can be picked up by the near-field sensors 18, in particular, within the frequency range of approximately 2-20 kHz (kilohertz). This frequency range also avoids signal degradation in hostile acoustic environments that occurs when higher ultrasonic frequencies are utilized and the decreased signal resolution that occurs when lower frequencies are utilized. These purpose-built alternative transmitters 20 could be deployed in any appropriate location in the system. These locations could include, but not be limited to, on or under the seismic source arrays 11 or their sub-arrays 16, on the hulls of the seismic survey ships 15, on or under lateral or vertical diverters 21 (such as paravanes), and on or under dedicated floats 22.

An example of these purpose-built transmitters as used in a different context is described in the patent by Jon Falkenberg et al. with U.S. Pat. No. 7,376,045 B2, "System and Method for Determining Positions of Towed Marine Seismic Streamers", and assigned to the assignee of the present invention. Falkenberg et al. describes a transmitter comprising a first piezoelectric tube element; a second piezoelectric tube element of approximately same diameter as the first tube element, adjacent to the first tube element, coaxial to a longitudinal axis of the first tube element, and adapted to have a sound velocity different from sound velocity in the first tube element; and a third piezoelectric tube element of substantially same diameter as the first tube element, adjacent to the second tube element, coaxial to a longitudinal axis of the second tube element, and adapted to have a sound velocity substantially equal to sound velocity in the first tube element.

A further embodiment comprises a free-floating protective tube surrounding the first, the second, and the third tube elements; a support ring separating the first tube element from the second tube element; a support ring separating the second tube element from the third tube element; a support ring separating an end of the protective tube from the first tube element; and a support ring separating another end of the protective tube from the third tube element.

The processor 13 is any appropriate combination or network of computer processing elements including, but not limited to, hardware (processors, temporary and permanent memory, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners, display devices such as monitors and printers, storage media such as disks and hard drives, and any other appropriate equipment). The invention will be illustrated by an embodiment with one processor 13, although any arrangement or location of multiple processors 13 in a network on or off the seismic survey vessels 15 is possible. Describing the invention in the embodiment with one processor 13 located on the seismic survey vessel 15 is not intended as a limitation of the invention, but merely for purposes of illustrative clarity. The extension of the illustrated method to embodiments with more than one processor 13 is straight forward.

The processor 13 is adapted to determine relative positions of the seismic source-array elements 17 located on the seismic source arrays 11. In the embodiment which utilizes the seismic source-array elements 17 as the seismic transmitters 12, illustrated in FIGS. 1 and 2, the processor 13 determines the relative positions from the seismic signals 19 transmitted by the seismic source-array elements 17 located on one seismic source array 11 and received at the near-field sensors 18 located on another seismic source array 11. The seismic source array 11 transmitting the seismic signals 19 is designated as the active source array (reference numeral 11' in FIG. 1), while the other seismic source array 11 receiving the seismic signals 19 is designated as the passive source array (reference numeral 11" in FIG. 1).

First, the processor 13 is adapted to determine travel times for the seismic signals 19 transmitted from the source-array elements 17 in the active source array 11' and received at the near-field sensors 18 in the passive source array 11". In one embodiment, the processor 13 could determine travel times for the seismic signals 19 by determining the transmission time of the seismic signal 19 at the active source array 11', determining the arrival time of the seismic signal 19 at the passive source array 11", and then subtracting the arrival time from the transmission time to get the travel time. In this embodiment, the processor 13 could determine the transmission time of the seismic signal 19 at the active source array 11' by using an activation schedule for the seismic source arrays 11. The processor 13 could determine the arrival time of the seismic signal 19 at the passive source array 11" by applying a peak detection algorithm to determine a first peak in the seismic signal 19. In practice, the peak detection algorithm would search for a first detectable peak, that is, the first peak to have a sufficient signal to noise ratio to be significantly detectable above the noise.

The active source array 11' and the passive source array 11" are typically towed relatively close to each other. A conventional activation of all the source-array elements 17 in the active source array 11' may reach the near-field sensors 18 in the passive source array 11" as one seismic signal 19. The seismic signals 19 from the individual source-array elements 17 in the active source array 11' may not be distinguishable. In this case, processing of the seismic signals 19 may only provide information about the relative spacing of the seismic source arrays 11 themselves, rather than more detailed information about the relative spacing between individual elements on the seismic source arrays 11. However, as discussed below, the processor 13 may have additional information concerning the positions of the seismic source-array elements 17 and near-field sensors 18 to enhance the further data processing.

Second, the processor 13 is adapted to calculate travel distances between the seismic source-array elements 17 located in the active source array 11' and the near-field sensors 18 located in the passive source array 11" from the previously-determined travel times. In one embodiment, the processor 13 is adapted to calculate the travel distances from the travel times by employing a local sound velocity in the water 14. For example, the travel distances can be calculated by multiplying the travel times by the local sound velocity in the water 14. The local sound velocity in the water 14 can be calculated or estimated. In the simplest case, the local sound velocity in the water 14 can even be assumed constant for the entire seismic survey. Alternatively, the local sound velocity in the water 14 can be measured by sound velocity sensors 23 located on the seismic source arrays 11, on the seismic survey vessels 15, dedicated floats 22, or elsewhere in the survey system, such as on marine seismic streamers (not shown). Sound velocity sensors 23, well known in the art, either measure the sound velocity in the water 14 directly, typically by an acoustic time of flight measurement, or calculate the sound velocity in the water 14 indirectly from other sensor-measured parameters, typically conductivity (to determine salinity), temperature, and depth (to determine pressure).

Third, the processor 13 is adapted to determine relative positions of the near-field sensors 18, and hence the positions of the adjacent seismic source-array elements 17, in the passive source array 11" from the previously-calculated travel distances. For example, the processor 13 could combine the calculated travel distances between pairs of seismic source-array elements 17 and near-field sensors 18 into a trilateration network representation of the relative positions of the seismic source-array elements 17 and the near-field sensors 18 in the seismic source arrays 11. A trilateration network is a two-dimensional model using triangular-shaped elements to represent the known relative distances between assigned nodes. Standard mathematical techniques are known in the art for solving for the relative positions of the nodes in a trilateration network.

The processor 13 also has other information already available about the positions of the seismic source-array elements 17 and near-field sensors 18 to add to the input data for the trilateration network. This additional position information can include, but is not limited to, a priori knowledge of the geometric structure of the seismic source arrays 11 and sub-arrays 16 and knowledge of the positions of the GPS receiver units typically deployed on seismic source arrays 11. The a priori knowledge of the geometric structure can include precise measurements of the seismic source arrays 11 (and their sub-arrays 16). The a priori knowledge can also include such basic facts as that the seismic source-array elements 17 are typically suspended from the seismic source arrays 11 in the in-line direction relative to the travel path of the seismic survey vessels 15 towing the seismic source arrays 11. Using the additional available information, the processor 13 can solve the trilateration network for the relative positions of the near-field sensors 18 located in the passive source array 11".

Then, the processor 13 can determine the relative positions of the seismic source-array elements 17 located in the passive source array 11" from the calculated positions of the adjacent near-field sensors 18.

In addition, the processor 13 is adapted to perform all the processing necessary to carry out the above determinations and calculations. This processing includes, but is not limited to, time synchronization of system components, activating the seismic source arrays 11, and applying preliminary conditioning to the seismic signals 19. The processor 13 could maintain time synchronization of the system by, for example, transmitting time synchronization signals to all the system components, such as the seismic source-array elements 17 and the near-field sensors 18. The processor 13 could activate the seismic source arrays 11 according to predetermined schedules dictated by the seismic data acquisition requirements. The preliminary conditioning of the seismic signal 19 may include, but is not limited to, pre-amplifying, filtering, and digitizing that portion of the seismic signal 19 that is needed for determining travel times.

In the embodiment which utilizes the alternative transmitters 20 as the seismic transmitters 12, illustrated in FIGS. 3 and 4, the processor 13 determines the relative positions from the seismic signals 19 transmitted by the alternative transmitters 20 and received at the near-field sensors 18 located on a seismic source array 11. The above discussion of how the processor 13 determines relative positions of the seismic source-array elements 17 located on a seismic source arrays 11 will still apply with straight forward substitution of the alternative transmitters 20 for the source-array elements 17 in the active source array 11'.

Figure 5:
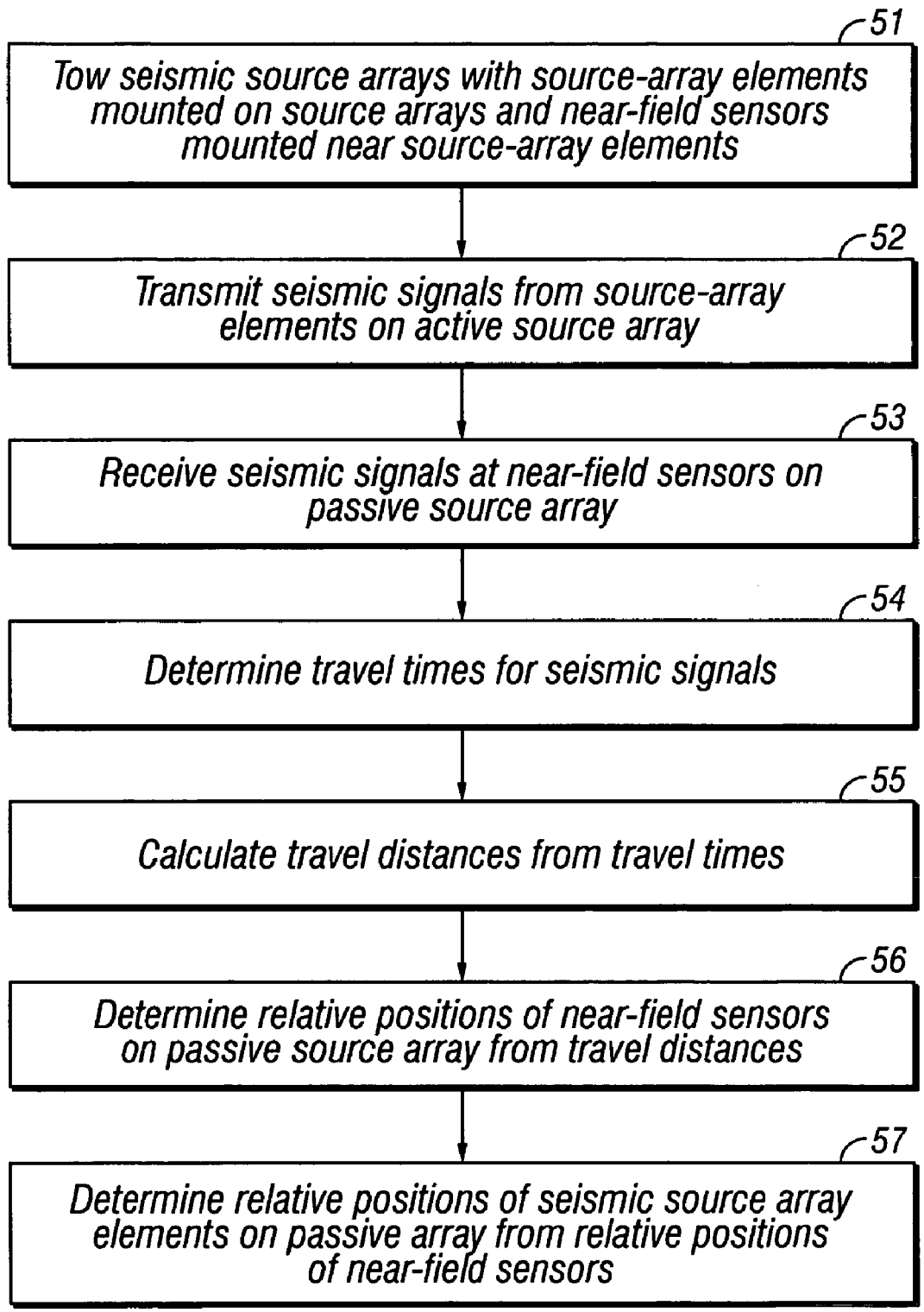
FIG. 5 is a flowchart illustrating the processing steps of an embodiment of the method of the invention for determining positions of seismic source-array elements in a towed marine source array, utilizing the seismic source-array elements as the seismic transmitters.

FIG. 5 shows a flowchart illustrating the processing steps of an embodiment of the method of the invention for determining positions of seismic source-array elements in a towed marine source array. In this embodiment, seismic source-array elements are utilized as the seismic transmitters.

Starting at step 51 in FIG. 5, a plurality of seismic source arrays are towed in a marine seismic survey. Typically, two source arrays are towed, to permit alternating activation of the source arrays. Although more than two source arrays may be towed, the invention will be illustrated by the embodiment with two source arrays. Describing the invention in the embodiment with two source arrays is not intended as a limitation of the invention, but merely for purposes of illustrative clarity. The extension of the illustrated method to embodiments with more than two source arrays is straight forward.

Each of the seismic source arrays comprises a plurality of seismic source-array elements, located in the seismic source array, and a plurality of near-field sensors, located in the seismic source array. Further, each near-field sensor is located in the vicinity of one of the seismic source-array elements. In one common embodiment, each seismic source element has a near-field sensor located adjacently on the seismic source array, at a distance of approximately 1 meter. This particular arrangement is employed in the notional source method for airgun signature monitoring, well known in the art.

At step 52, seismic signals are transmitted from the seismic source-array elements located in one of the seismic source arrays described in step 51. The seismic source array transmitting the seismic signals is designated as the active source array.

At step 53, the seismic signals transmitted in step 52 are received at the near-field sensors located in another of the seismic source arrays described in step 51. The seismic source array receiving the seismic signals, distinct from the active seismic source array described in step 52, is designated as the passive source array.

At step 54, travel times are determined for the seismic signals transmitted from the source-array elements located in the active source array in step 52 and received at the near-field sensors located in the passive source array in step 53.

At step 55, travel distances are calculated from the travel times determined in step 54. These travel distances yield the distances between the source-array elements located in the active source array and the near-field sensors located in the passive source array. In one embodiment, the local sound velocity in water is determined in the vicinity of the source-array elements located in the active source array and the near-field sensors located in the passive source array. Then, the travel distances may be calculated by multiplying the travel times by the local sound velocity in water. The local sound velocity in water can be calculated, estimated, or measured by sound velocity sensors located in the vicinity of the seismic source arrays, on the seismic survey vessels, or elsewhere in the marine seismic survey system.

At step 56, relative positions of the near-field sensors located in the passive source array are determined from the travel distances calculated in step 55. In one embodiment, the travel distances between the source-array elements located in the active source array and the near-field sensors located in the passive source array are combined to construct a trilateration network representation of the distances between all the pairs of source-array elements and near-field sensors located in the towed seismic source arrays. Then, the trilateration network is solved to obtain the relative positions of the near-field sensors located in the passive source array. Standard mathematical techniques are known in the art for solving a trilateration network.

Any other information already available about the positions of the seismic source-array elements and near-field sensors is included in the trilateration network representation. In one embodiment, this additional position information is a priori knowledge of the geometric structure of the seismic source arrays and sub-arrays. For example, even if precise measurements of the relative positions of the sub-arrays within the source arrays is not available, it is known that the seismic source-array elements are typically suspended from the seismic source arrays in the in-line direction. In another embodiment, position information comes from knowledge of the positions of the GPS receiver units typically deployed on seismic source arrays.

At step 57, relative positions of the seismic source-array elements located in the passive source array are determined from the adjacent positions of the near-field sensors located in the passive source array, as calculated in step 56.

Figure 6:
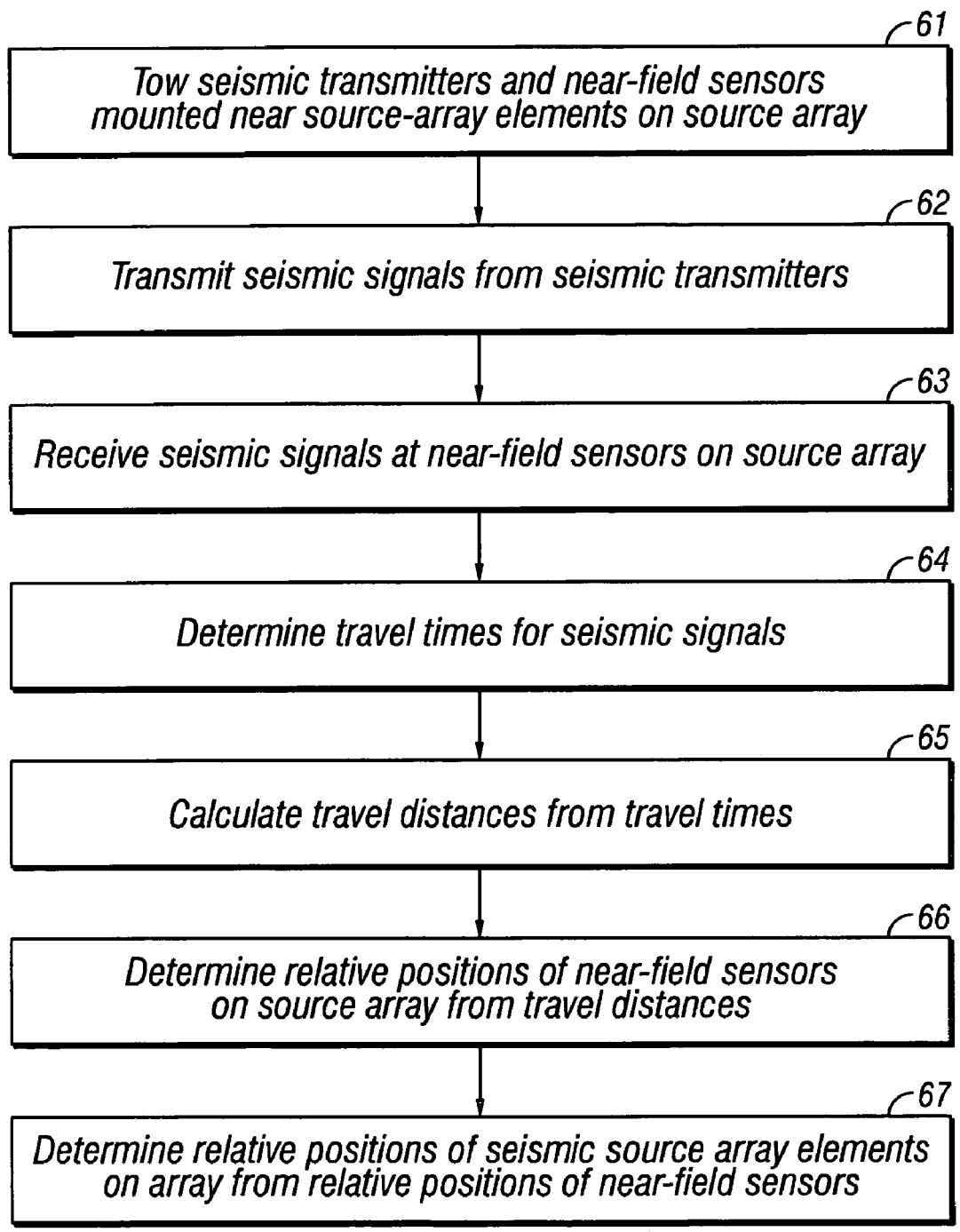
FIG. 6 is a flowchart illustrating the processing steps of an embodiment of the method of the invention for determining positions of seismic source-array elements in a towed marine source array, utilizing purpose-built seismic transmitters as the seismic transmitters.

FIG. 6 shows a flowchart illustrating the processing steps of an embodiment of the method of the invention for determining positions of seismic source-array elements in a towed marine source array. In this embodiment, purpose-built transmitters are utilized as the seismic transmitters.

Starting at step 61 in FIG. 6, a plurality of seismic transmitters and at least one seismic source array are towed in a marine seismic survey. The seismic source arrays comprises a plurality of seismic source-array elements, located in the seismic source array, and a plurality of near-field sensors, also located in the seismic source array. Further, each near-field sensor is located in the vicinity of one of the seismic source-array elements.

At step 62, seismic signals are transmitted from the plurality of seismic transmitters described in step 61.

At step 63, the seismic signals transmitted by the seismic transmitters in step 62 are received at near-field sensors located in the seismic source array described in step 61.

At step 64, travel times are determined for the seismic signals transmitted from the seismic transmitters in step 62 and received at the near-field sensors located in the source array in step 63.

At step 65, travel distances are calculated from the travel times determined in step 64. These travel distances yield the distances between the seismic transmitters and the near-field sensors located in the source array. In one embodiment, the local sound velocity in water is determined in the vicinity of the seismic transmitters and the near-field sensors located in the source array. Then, the travel distances may be calculated by multiplying the travel times by the local sound velocity in water. The local sound velocity in water can be calculated, estimated, or measured by sound velocity sensors located in the vicinity of the seismic source arrays, on the seismic survey vessels, or elsewhere in the marine seismic survey system.

At step 66, relative positions of the near-field sensors located in the source array are determined from the travel distances calculated in step 65. In one embodiment, the travel distances between the seismic transmitters and the near-field sensors located in the source array are combined to construct a trilateration network representation of the distances between all the pairs of seismic transmitters and near-field sensors located in the towed seismic source arrays. Then, the trilateration network is solved to obtain the relative positions of the near-field sensors located in the source array. Standard mathematical techniques are known in the art for solving a trilateration network.

Any other information already available about the positions of the seismic transmitters and near-field sensors is included in the trilateration network representation. In one embodiment, this additional position information is a priori knowledge of the geometric structure of the seismic source arrays and sub-arrays. For example, even if precise measurements of the relative positions of the sub-arrays within the source arrays is not available., it is known that the seismic source-array elements are typically suspended from the seismic source arrays in the in-line direction. In another embodiment, position information comes from knowledge of the positions of the GPS receiver units typically deployed on seismic source arrays.

At step 67, relative positions of the seismic source-array elements located in the source array are determined from the adjacent positions of the near-field sensors located in the source array, as calculated in step 66.

In a yet further embodiment, any combination of seismic source array elements, conventional seismic transmitters, and purpose-built seismic transmitters could be utilized as the seismic transmitters in the system and method of the invention.

The invention is a system and a method for accurate determination of the positions of source-array elements located in a towed marine source array. The invention can be practiced employing equipment already being used during current marine seismic surveys and thus can process data that is already being recorded. Further, the invention can provide an alternative or backup system for conventional means for positioning source arrays, such as GPS receiver units. Further, the invention can provide accurate positioning information for seismic source monitoring.

Thus, the invention would be particularly useful in monitoring the source signatures of towed airgun arrays during marine seismic surveys. An example of this use is in the patent by Gregory Earnest Parkes with U.S. Pat. No. 7,218,572 B2, "Method of Seismic Source Monitoring Using Modeled Source Signatures with Calibration Functions", and assigned to the assignee of the present invention. In Parkes, physical factors, including the positions of the seismic source array elements as determined by the present invention, are measured for a plurality of seismic sources, preferably for each activation of the seismic sources. Calibration functions are obtained by comparison of measured and modeled seismic source signatures for each seismic source. Then, in one described embodiment, the measured physical parameters and calibration functions are applied to a model, which generates a calibrated source signature for the seismic source array.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A system for determining positions of towed marine seismic source-array elements, comprising:
    a plurality of seismic transmitters;
    at least one seismic source array, wherein the seismic source array comprises:
        a plurality of seismic source-array elements, mounted within the seismic source array; and
        a plurality of near-field sensors, wherein each near-field sensor is mounted within the seismic source array in the vicinity of one of the seismic source-array elements; and
    a processor adapted to determine relative positions of the seismic source-array elements on the seismic source array repeatedly during seismic data acquisition from relative positions of the near-field sensor determined from the seismic signals transmitted simultaneously by each of the seismic transmitters repeatedly during seismic data acquisition and received at the near-field sensors on the seismic source array.

2. The system of claim 1, wherein the seismic transmitters are seismic source-array elements on a seismic source array.

3. The system of claim 2, wherein the seismic transmitters are seismic source-array elements located on a seismic source array distinct from the seismic source array on which the near-field sensors are located.

4. The system of claim 1, wherein the processor is further adapted to:
    determine travel times for the received seismic signals, and
    determine relative positions of the seismic source-array elements from the determined travel times.

5. The system of claim 4, wherein the processor is further adapted to:
    calculate travel distances between the seismic transmitters and the near-field sensors from the travel times, and
    determine relative positions of the seismic source-array elements from the calculated travel distances.

6. The system of claim 5, wherein the processor is further adapted to:
    determine relative positions of the near-field sensors from the calculated travel distances; and
    determine relative positions of the seismic source-array elements from the relative positions of the near-field sensors.

7. The system of claim 6, wherein the processor is further adapted to:
- combine the travel distances to form a trilateration network representation of the distances between the seismic transmitters and the near-field sensors; and
- solve the trilateration network representation to determine the relative positions of the near-field sensors in the seismic source array.

8. The system of claim 5, wherein the processor is further adapted to employ a local sound velocity in water to calculate the travel distances from the travel times.

9. The system of claim 8, further comprising:
- sound velocity sensors deployed on the seismic source arrays, adapted to determine the local sound velocity in water.

10. The system of claim 1, wherein the seismic transmitters are adapted to operate in a frequency band of approximately 2 to 20 kHz.

11. A method for determining positions of towed marine seismic source-array elements, comprising:
- towing a plurality of seismic transmitters;
- towing a plurality of seismic source arrays, wherein each seismic source array comprises:
  - a plurality of seismic source-array elements, mounted within the seismic source array; and
  - a plurality of near-field sensors, wherein each near-field sensor is mounted within the seismic source array in the vicinity of one of the seismic source-array elements;
- transmitting seismic signals simultaneously from each of the seismic transmitters repeatedly during seismic data acquisition;
- receiving the transmitted seismic signals at near-field sensors on a seismic source array; and
- determining relative positions of the seismic source-array elements on the seismic source array repeatedly during seismic data acquisition from relative positions of the near-field sensors determined from the received seismic signals.

12. The method of claim 11, wherein the seismic transmitters are seismic source-array elements on a seismic source array.

13. The method of claim 12, wherein the seismic transmitters are seismic source-array elements located on a seismic source array distinct from the seismic source array on which the near-field sensors are located.

14. The method of claim 11, wherein determining the relative positions of the seismic source-array elements further comprises:
- determining travel times for the received seismic signals; and
- determining relative positions of the seismic source-array elements from the determined travel times.

15. The method of claim 14, wherein determining the relative positions of the seismic source-array elements further comprises:
- calculating travel distances between the seismic transmitters and the near-field sensors from the determined travel times; and
- determining relative positions of the seismic source-array elements from the calculated travel distances.

16. The method of claim 15, wherein determining the relative positions of the seismic source-array elements further comprises:
- determining relative positions of the near-field sensors from the calculated travel distances; and
- determining relative positions of the seismic source-array elements from the relative positions of the near-field sensors.

17. The method of claim 16, wherein determining the relative positions of the streamers comprises:
- combining the travel distances to form a trilateration network representation of the distances between the seismic transmitters and the near-field sensors; and
- solving the trilateration network representation to determine the relative positions of the near-field sensors in the seismic source array.

18. The method of claim 15, wherein calculating the travel distances from the travel times further comprises:
- employing a local sound velocity in water to calculate the travel distances from the travel times.

19. The method of claim 18, wherein calculating the travel distances from the travel times further comprises:
- deploying sound velocity sensors to determine the local sound velocity in water.

20. The method of claim 11, wherein transmitting seismic signals from the seismic transmitters further comprises:
- operating the seismic transmitters in a frequency band of approximately 2 to 20 kHz.

21. A system for determining positions of towed marine seismic source-array elements, comprising:
- a plurality of seismic source arrays, wherein each seismic source array comprises:
  - a plurality of seismic source-array elements, mounted within the seismic source array; and
  - a plurality of near-field sensors, wherein each near-field sensor is mounted within the seismic source array in the vicinity of one of the seismic source-array elements; and
- a processor adapted to determine relative positions of the seismic source-array elements on a first seismic source array repeatedly during seismic data acquisition from relative positions of the near-field sensors determined from the seismic signals transmitted simultaneously by each of the seismic source-array elements on a second source array repeatedly during seismic data acquisition and received at the near-field sensors on the first seismic source array.

22. A method for determining positions of towed marine seismic source-array elements, comprising:
- towing a plurality of seismic source arrays, wherein each seismic source array comprises:
  - a plurality of seismic source-array elements, mounted within the seismic source array; and
  - a plurality of near-field sensors, wherein each near-field sensor is mounted within the seismic source array in the vicinity of one of the seismic source-array elements;
- transmitting seismic signals simultaneously from each of the seismic source-array elements on a first seismic source array repeatedly during seismic data acquisition;
- receiving the transmitted seismic signals at near-field sensors on a second seismic source array; and
- determining relative positions of the seismic source-array elements on the first seismic source array repeatedly during seismic data acquisition from relative position of the near-field sensor determined from the received seismic signals.

* * * * *